United States Patent
Demarest

(10) Patent No.: US 10,408,399 B1
(45) Date of Patent: Sep. 10, 2019

(54) RECHARGEABLE WIRELESS LAMP

(71) Applicant: Dawn Demarest, Puyallup, WA (US)

(72) Inventor: Dawn Demarest, Puyallup, WA (US)

(*) Notice: Subject to any disclaimer, the term of this patent is extended or adjusted under 35 U.S.C. 154(b) by 0 days.

(21) Appl. No.: 15/925,879

(22) Filed: Mar. 20, 2018

(51) Int. Cl.
*F21S 9/02* (2006.01)
*F21S 6/00* (2006.01)
*F21V 23/04* (2006.01)
*F21S 8/00* (2006.01)
*F21Y 115/10* (2016.01)
*F21L 4/08* (2006.01)

(52) U.S. Cl.
CPC . *F21S 9/02* (2013.01); *F21L 4/08* (2013.01); *F21S 6/003* (2013.01); *F21S 6/005* (2013.01); *F21V 23/04* (2013.01); *F21S 8/035* (2013.01); *F21Y 2115/10* (2016.08)

(58) Field of Classification Search
CPC .. F21S 6/002; F21S 6/003; F21S 6/005; F21S 6/006; F21S 6/007; F21S 6/008; F21S 8/035; F21S 9/02; F21S 9/022; F21L 4/08; F21V 23/02; F21V 23/023
See application file for complete search history.

(56) References Cited

U.S. PATENT DOCUMENTS

| | | | |
|---|---|---|---|
| 4,029,954 A * | 6/1977 | Moyer | F21L 4/085 320/115 |
| 4,502,102 A * | 2/1985 | Phipps | F21L 4/005 362/183 |
| 7,019,464 B2 | 3/2006 | Nevins | |
| D524,980 S | 7/2006 | Robinson | |
| 7,249,864 B2 | 7/2007 | Smith | |
| 7,665,882 B1 * | 2/2010 | Wang | F21K 9/00 362/253 |
| 7,824,061 B1 | 11/2010 | Riedfort | |
| 8,303,142 B2 | 11/2012 | Bryant | |
| 9,097,399 B2 | 8/2015 | Fitzwater, II | |
| 9,347,633 B1 * | 5/2016 | Fitzwater, II | F21S 9/02 |
| 2003/0146735 A1 * | 8/2003 | Barbeau | F21L 2/00 320/114 |
| 2004/0264187 A1 * | 12/2004 | Vanderschuit | F21S 6/005 362/235 |
| 2005/0194930 A1 * | 9/2005 | Barbeau | F21L 2/00 320/116 |
| 2007/0014105 A1 | 1/2007 | Noguchi | |

(Continued)

FOREIGN PATENT DOCUMENTS

WO    2001084042    11/2001

*Primary Examiner* — Alexander K Garlen

(57) ABSTRACT

The rechargeable wireless lamp is a lantern. The rechargeable wireless lamp illuminates a space without requiring a connection to an external power source. The rechargeable wireless lamp comprises a lamp base, a charging base, and a light bulb. The lamp base is a structure that: 1) electrically connects to the light bulb; and, 2) turns the light bulb on and off. The light bulb is an electrical circuit that generates a first level of illumination. The light bulb has an internal power source that provides power for the illumination of the rechargeable wireless lamp. The charging base is an electrical circuit that recharges the internal power source of the light bulb. The light bulb further comprises a night light function. Specifically, the light bulb generates a second level of illumination that is activated in periods of darkness.

13 Claims, 11 Drawing Sheets

(56) References Cited

U.S. PATENT DOCUMENTS

| | | | |
|---|---|---|---|
| 2008/0252251 A1* | 10/2008 | Joasil | H02J 7/0027 320/101 |
| 2009/0154148 A1* | 6/2009 | Meyer | F21L 2/00 362/157 |
| 2012/0039063 A1* | 2/2012 | Chao | F21S 9/022 362/20 |
| 2014/0265905 A1 | 9/2014 | Ray | |

* cited by examiner

RECHARGEABLE WIRELESS LAMP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and heating including functional features and details of a lighting device, more specifically, an arrangement of circuit elements for a lighting device.

SUMMARY OF INVENTION

The rechargeable wireless lamp is a lantern. The rechargeable wireless lamp illuminates a space without requiring a connection to an external power source. The rechargeable wireless lamp comprises a lamp base, a charging base, and a light bulb. The lamp base is a structure that: 1) electrically connects to the light bulb; and, 2) turns the light bulb on and off. The light bulb is an electrical circuit that generates a first level of illumination. The light bulb has an internal power source that provides power for the illumination of the rechargeable wireless lamp. The charging base is an electrical circuit that recharges the internal power source of the light bulb. The light bulb further comprises a night light function. Specifically, the light bulb generates a second level of illumination that is activated in periods of darkness.

These together with additional objects, features and advantages of the rechargeable wireless lamp will be readily apparent to those of ordinary skill in the art upon reading the following detailed description of the presently preferred, but nonetheless illustrative, embodiments when taken in conjunction with the accompanying drawings.

In this respect, before explaining the current embodiments of the rechargeable wireless lamp in detail, it is to be understood that the rechargeable wireless lamp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rechargeable wireless lamp.

It is therefore important that the claims be regarded as including such equivalent construction insofar as they do not depart from the spirit and scope of the rechargeable wireless lamp. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
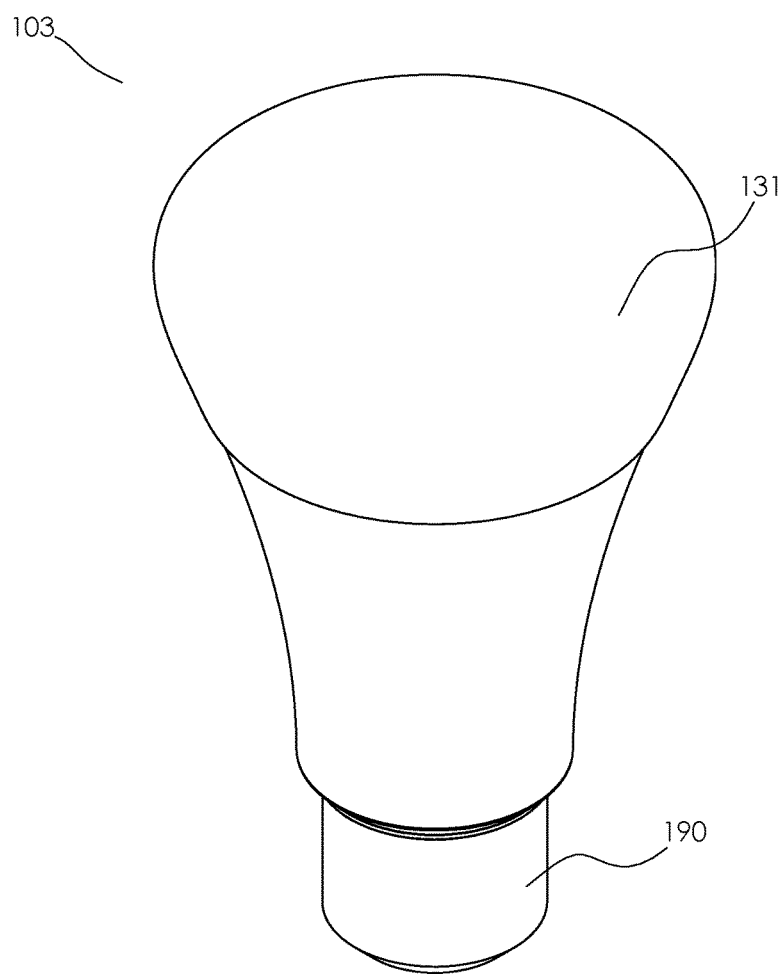
FIG. 1 is a perspective detail view of an embodiment of the disclosure.
Figure 2:
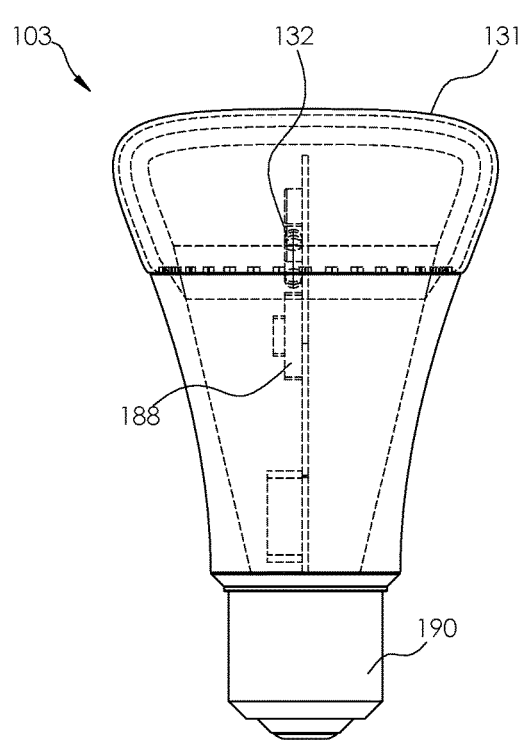
FIG. 2 is a detail view of an embodiment of the disclosure.
Figure 3:
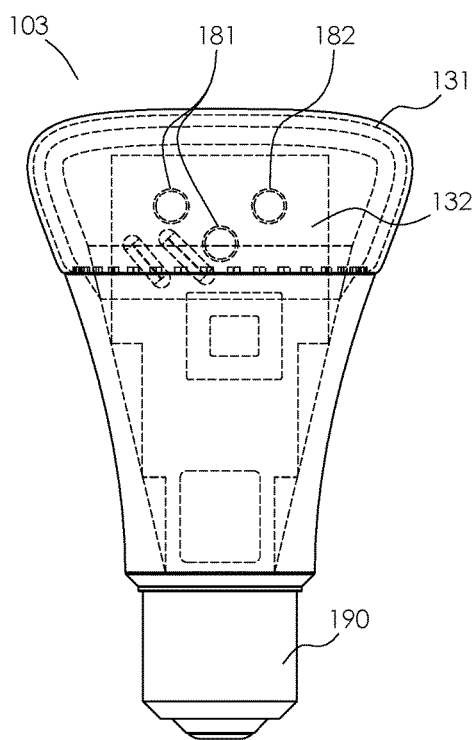
FIG. 3 is a detail view of an embodiment of the disclosure.
Figure 4:
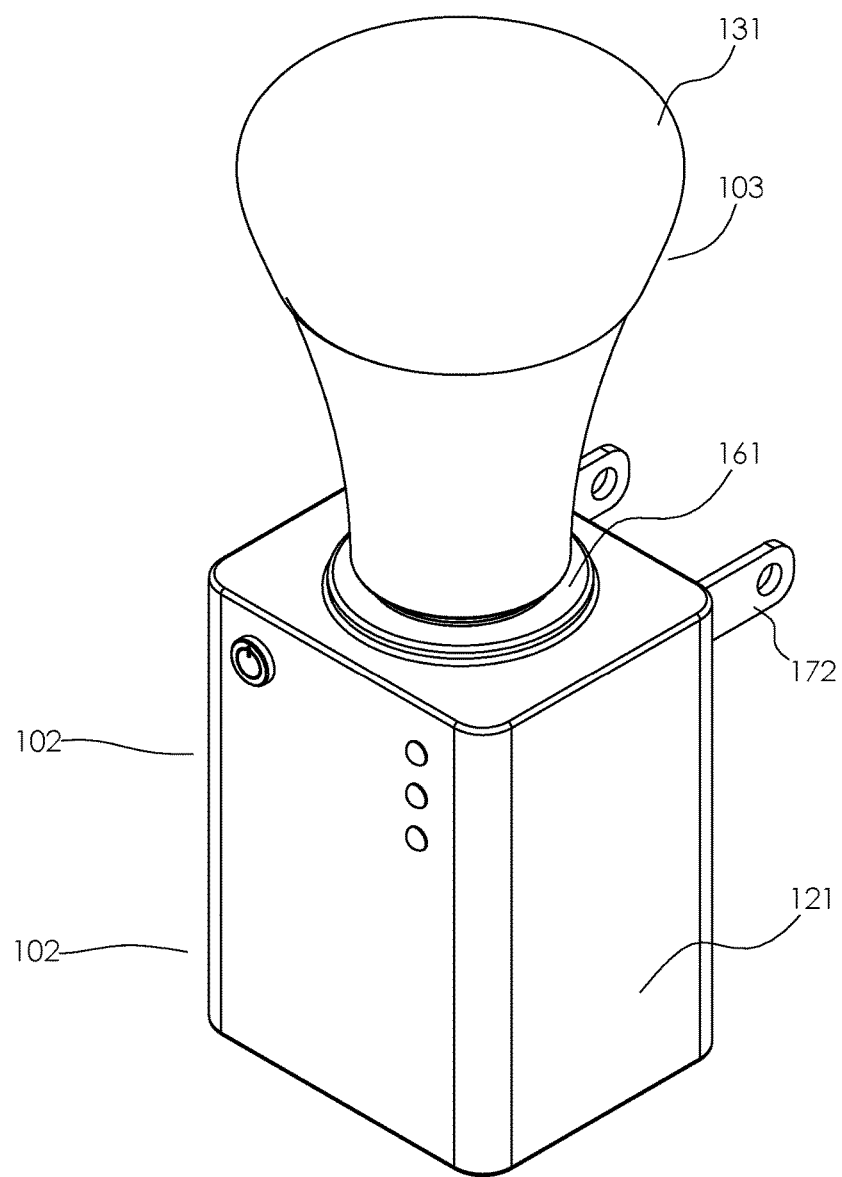
FIG. 4 is a detail in-use view of an embodiment of the disclosure.
Figure 5:
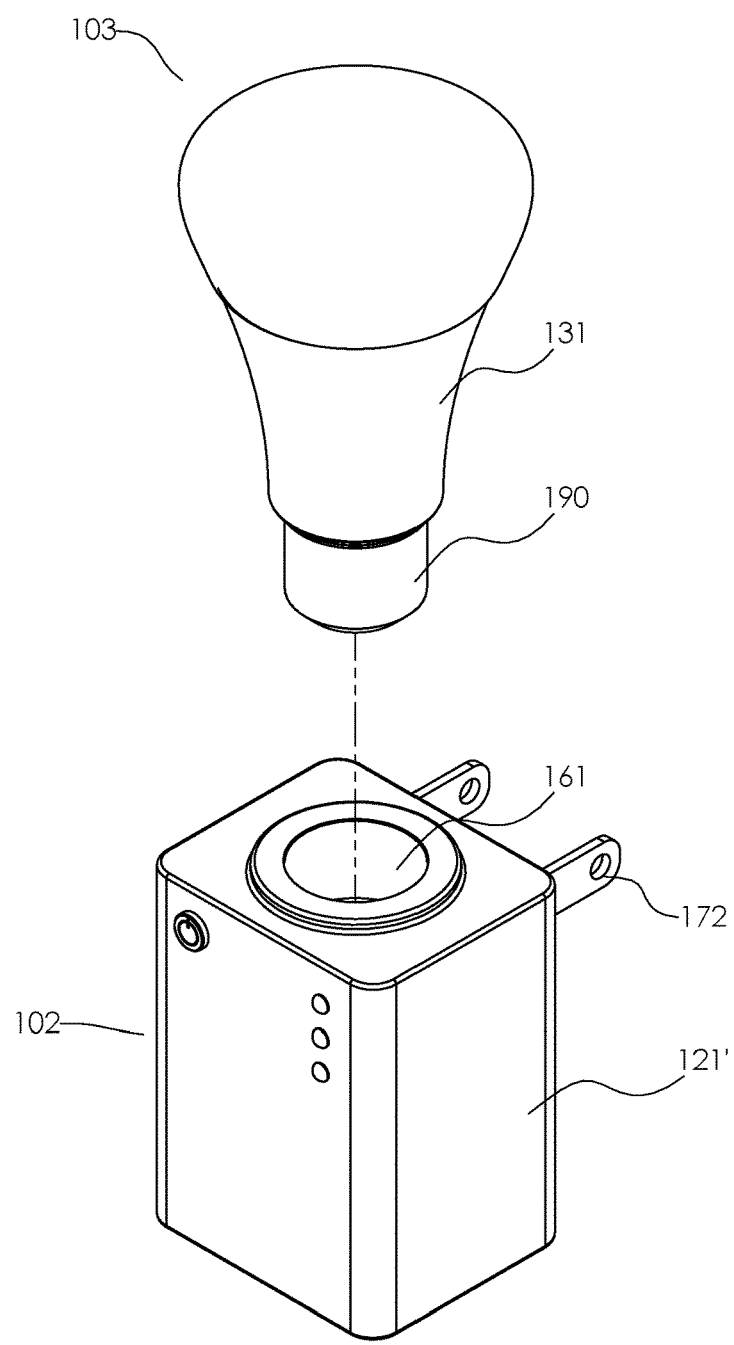
FIG. 5 is an exploded in-use view of an embodiment of the disclosure.
Figure 6:
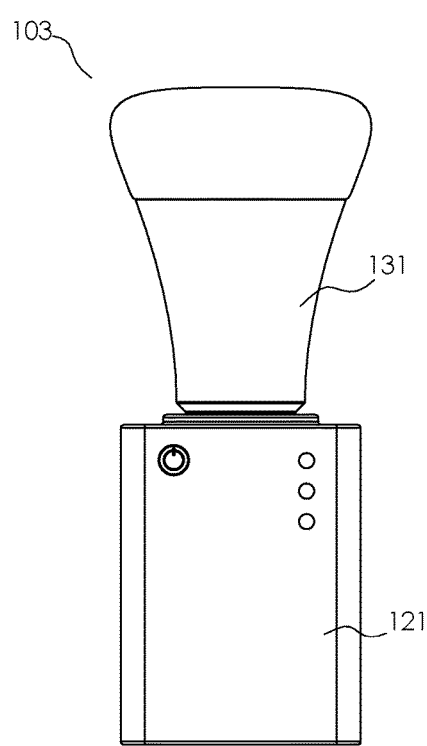
FIG. 6 is a front detail view of an embodiment of the disclosure.
Figure 7:
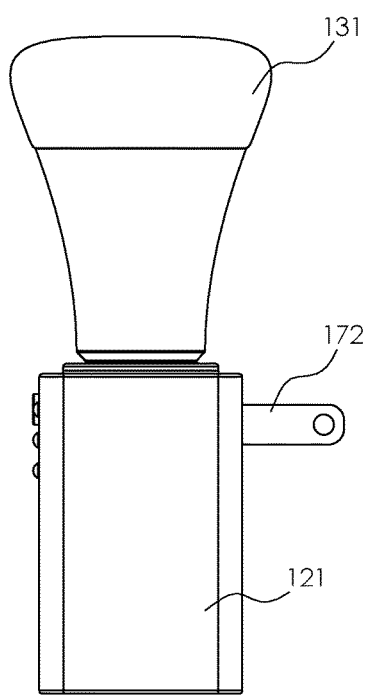
FIG. 7 is a side detail view of an embodiment of the disclosure.
Figure 8:
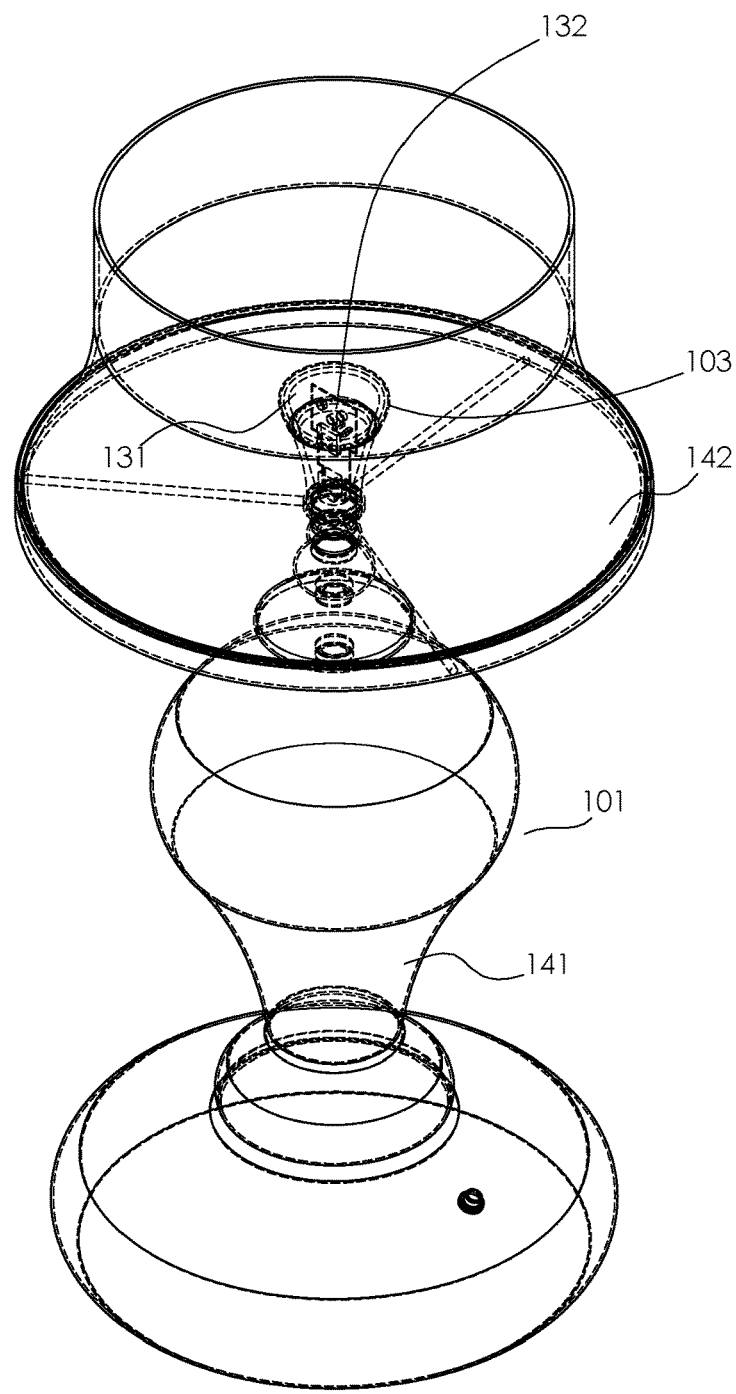
FIG. 8 is a perspective view of an embodiment of the disclosure.
Figure 9:
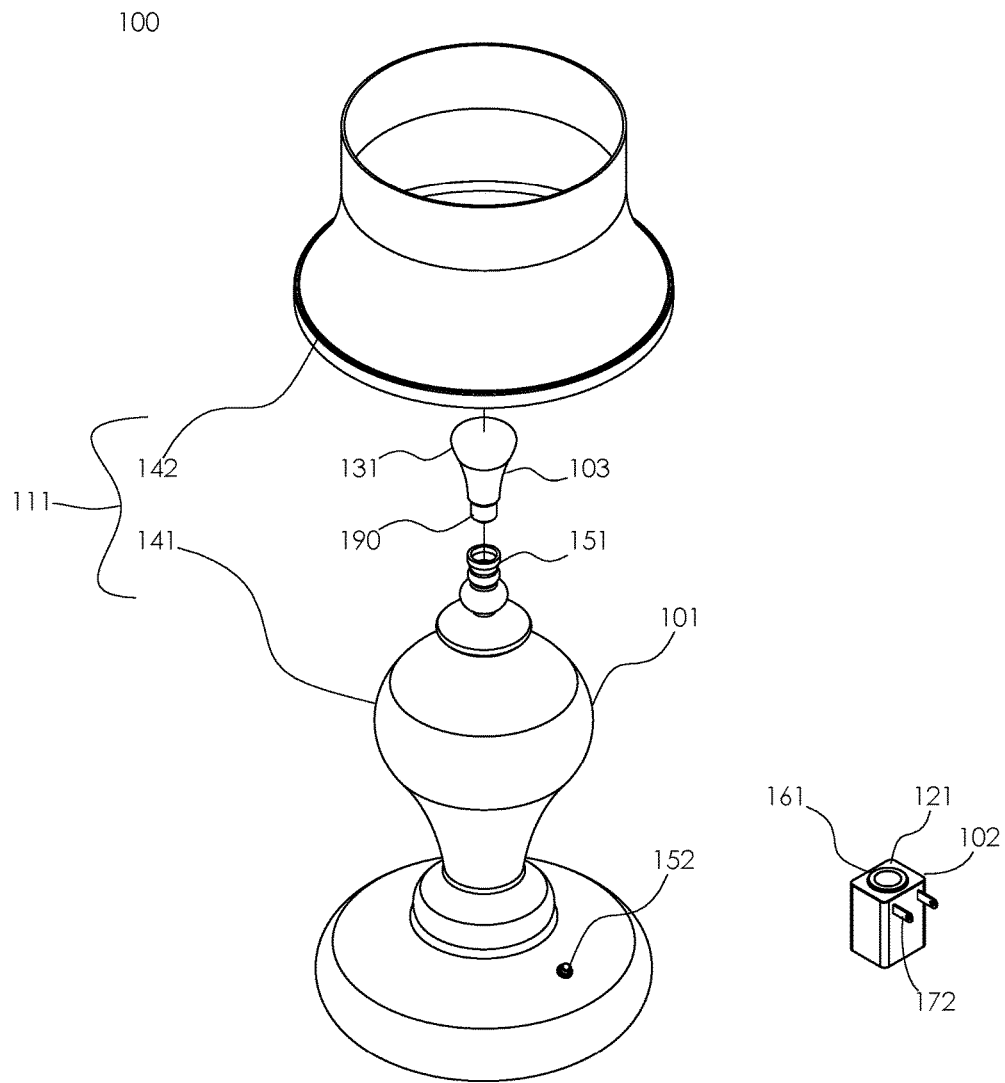
FIG. 9 is a perspective exploded view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 13.

The rechargeable wireless lamp 100 (hereinafter invention) is a lantern. The invention 100 illuminates a space without requiring a connection to an external power source 173. The invention 100 comprises a lamp base 101, a charging base 102, and a light bulb 103. The lamp base 101 is a structure that: 1) electrically connects to the light bulb 103; and, 2) turns the light bulb 103 on and off. The light bulb 103 is an electrical circuit that generates a first level of illumination. The light bulb 103 has an internal power source that provides power for the illumination of the invention 100. The charging base 102 is an electrical circuit that recharges the internal power source of the light bulb 103. The light bulb 103 further comprises a night light function. Specifically, the light bulb 103 generates a second level of illumination that is activated in periods of darkness.

The lamp base 101 is a decorative extension structure that raises the light bulb 103 above a supporting surface. The light bulb 103 attaches to the lamp base 101. The lamp base 101 comprises a lamp structure 111 and a lamp operation circuit 112.

The lamp structure 111 is a housing. The lamp structure 111 contains the lamp operation circuit 112. The lamp structure 111 is formed with all apertures and form factors necessary to allow the lamp structure 111 to accommodate the use and operation of the invention 100. The lamp structure 111 comprises a stanchion 141 and a shade 142. The stanchion 141 is a vertically oriented post structure that forms the extension structure of the lamp base 101. The purpose of the stanchion 141 is to raise the light bulb 103 above the supporting surface the lamp base 101 rests on. The shade 142 is a decorative structure that is commonly referred to as a "lampshade." The shade 142 is a cover that is placed around the light bulb 103. The purpose of the shade 142 is to redirect and adjust the intensity of the light generated by the light bulb 103.

The lamp operation circuit 112 is a switching circuit that electrically connects to the bulb circuit 132 of the light bulb 103. The lamp operation circuit 112 initiates and extinguishes the first level of illumination generated by the light bulb 103. The lamp operation circuit 112 comprises a first socket 151 and a maintained switch 152. The first socket 151 is further defined with a third lead 263 and a fourth lead 264. The maintained switch 152 is further defined with a fifth lead 265 and a sixth lead 266.

The first socket 151 is the port segment that attaches the light bulb 103 to the lamp base 101. The first socket 151 is externally accessible such that the plug 190 of the bulb circuit 132 can be inserted into the first socket 151. The maintained switch 152 is a commercially available electrical switch. As discussed in greater detail elsewhere in this disclosure, the maintained switch 152 completes an electrical connection between the rechargeable battery 188 of the bulb circuit 132 and the first plurality of LEDs 181 of the bulb circuit 132 to generate the first level of illumination.

The charging base 102 is an electrical device. The charging base 102 recharges the internal power source of the light bulb 103 in preparation for the future use of the light bulb 103. The charging base 102 draws electrical power from an external power source 173. The charging base 102 comprises a charger housing 121 and a charging circuit 122.

The charger housing 121 is a housing. The charger housing 121 contains the charging circuit 122. The charger housing 121 is formed with all apertures and form factors necessary to allow the charger housing 121 to accommodate the use and operation of the invention 100.

The charging circuit 122 is an electrical circuit. The charging circuit 122 generates a DC voltage that is used to recharge the rechargeable battery 188 contained within the bulb circuit 132. The charging circuit 122 comprises a second socket 161, a DC power source 162, and a second diode 163. The second diode 163 is further defined with a second anode 202 and a second cathode 212. The second socket 161 is further defined with a seventh lead 267 and an eighth lead 268. The DC power source 162 is further defined with a second positive terminal 242 and a second negative terminal 252.

The second socket 161 is the port segment that attaches the light bulb 103 to the charging base 102. The second socket 161 is externally accessible such that the plug 190 of the bulb circuit 132 can be seated directly into the second socket 161. The DC power source 162 is a source of electric DC energy that is used to recharge the rechargeable battery 188 of the bulb circuit 132. The DC power source 162 draws, rectifies, conditions, and regulates electrical power from an external power source 173. The use of a DC power source 162 is well-known and documented in the electrical arts. The second diode 163 is described elsewhere in this disclosure.

The DC power source 162 comprises an AC/DC converter 171, a NEMA 5/15P electrical plug 172, and an external power source 173. The AC/DC converter 171 is a commercially available electrical circuit that converts an AC source of electrical energy into a regulated DC voltage source. The AC/DC converter 171 provides the electric DC power that recharges the rechargeable battery 188 of the bulb circuit 132. The external power source 173 is a source of electrical energy that is provisioned externally. In the first potential embodiment of the disclosure, the external power source 173 provides a source of AC electrical power through the national electric grid. The NEMA 5/15P electrical plug 172 is a readily and commercially available attachment device that connects the AC/DC converter 171 to the national electric grid. The use of a NEMA 5/15P electrical plug 172 is well-known and documented in the electrical arts.

The light bulb 103 is an electrical device. The light bulb 103 generates the illumination provided by the invention 100. The light bulb 103 generates a first level of illumination that provides for the general illumination of a space. The light bulb 103 further generates a second level of illumination that has an intensity that is less than the first level of illumination. The second level of illumination generated by the light bulb 103 is commonly referred to as a "night light." The second level of illumination generated by the light bulb 103 is activated when the light bulb 103 detects darkness. The light bulb 103 has an integrated rechargeable power source that allows the light bulb 103 to generate illumination without an electrical connection to the external power source 173. The light bulb 103 comprises a translucent housing 131 and a bulb circuit 132.

The translucent housing 131 is a housing. The translucent housing 131 is formed from a translucent material that allows the light generated by the light bulb 103 to pass through the translucent housing 131. The translucent housing 131 contains the bulb circuit 132. The translucent housing 131 is formed with all apertures and form factors necessary to allow the translucent housing 131 to accommodate the use and operation of the invention 100. The plug 190 is externally accessible and projects away from the translucent housing 131.

The bulb circuit 132 is an electrical circuit. The bulb circuit 132: 1) provides the electrical power required to generate the first level of illumination and the second level of illumination; 2) generates the first level of illumination when the bulb circuit 132 is electrically connected to the lamp base 101; and, 2) generates the second level of illumination when the light bulb 103 detects that the light bulb 103 is in darkness. The bulb circuit 132 comprises a first plurality of LEDs 181, a second plurality of LEDs 182, a first limit resistor 183, a second limit resistor 184, a transistor 185, a phototransistor 186, a pull-up resistor 187, a rechargeable battery 188, a first diode 189, and a plug 190.

The first diode 189 is further defined with a first anode 201 and a first cathode 211. Each of the first plurality of LEDs 181 is further defined with a third anode 203 and a third cathode 213. Each of the second plurality of LEDs 182 is further defined with a fourth anode 204 and a fourth cathode 214. The transistor 185 is further defined with a first collector 221, a first emitter 222, and a first base 223. The phototransistor 186 is further defined with a second collector 231 and a second emitter 232. The rechargeable battery 188 is further defined with a first positive terminal 241 and a first negative terminal 251. The first limit resistor 183 is further defined with a ninth lead 269 and a tenth lead 270. The second limit resistor 184 is further defined with an eleventh lead 271 and a twelfth lead 272. The pull-up resistor 187 is further defined with a thirteenth lead 273 and a fourteenth lead 274. The Plug 190 is further defined with a first lead 261 and a second lead 262.

The first plurality of LEDs 181 comprises a first set of light emitting diodes that generate the first level of illumination. The first plurality of LEDs 181 are electrically interconnected in a parallel circuit. The first plurality of LEDs 181 draws power from the rechargeable battery 188 when illuminated. As shown most clearly in FIG. 11, the flow of electricity from the rechargeable battery 188 to the first plurality of LEDs 181 is controlled by the maintained switch 152. Specifically, the rechargeable battery 188, the maintained switch 152, and the first plurality of LEDs 181 are wired in a series circuit using the first socket 151 and the plug 190.

The second plurality of LEDs 182 comprises a second set of light emitting diodes that generate the second level of illumination. The second plurality of LEDs 182 are electrically interconnected in a parallel circuit. The transistor 185, the phototransistor 186, and the pull-up resistor 187 control the operation of the second plurality of LEDs 182.

The transistor 185 is a three-terminal semiconducting device. The transistor 185 operates as a switch. When a voltage is applied to the first base 223, electric current will flow into the first base 223 and the transistor 185 will act like a closed switch allowing electric current to flow from the first collector 221 to the first emitter 222. When the voltage is removed from the first base 223, the transistor 185 will act like an open switch disrupting electric current flow from the first collector 221 to the first emitter 222.

The transistor 185 acts as a switch that is placed in series between the rechargeable battery 188 and the second plurality of LEDs 182. When the phototransistor 186 detects darkness, an electric current flows into the first base 223 of the transistor 185 such that the transistor 185 acts as a closed switch that passes electric current from the rechargeable battery 188 to the second plurality of LEDs 182.

The phototransistor 186 operates as a switch. When light is applied to the phototransistor 186, the phototransistor 186 will act like a closed switch allowing electric current flow from the second collector 231 to the second emitter 232. When light is removed from the phototransistor 186, the phototransistor 186 will act like an open switch prohibiting electric current flow from the second collector 231 to the second emitter 232. The purpose of the phototransistor 186 is to act as a photoswitch that limits the illumination of the second plurality of LEDs 182 to periods of darkness.

The transistor 185, the phototransistor 186, and the pull-up resistor 187 combine to: 1) detect when the phototransistor 186 is in darkness; and 2) limits the flow of electricity from the rechargeable battery 188 into the second plurality of LEDs 182 to periods when the phototransistor 186 detects that the phototransistor 186 is at a previously determined level of darkness. The first limit resistor 183 is an electrical resistor that limits the flow of electricity through the first plurality of LEDs 181. The second limit resistor 184 is an electrical resistor that limits the flow of electricity through the second plurality of LEDs 182.

The phototransistor 186 is wired as a switch that bypasses the first base 223 of the transistor 185. When the phototransistor 186 detects light, the phototransistor 186 shorts the electric current flowing through the pull-up resistor 187 directly to the first negative terminal 251 of the rechargeable battery 188 thereby preventing electric current from entering the first base 223 of the transistor 185. This effectively opens the switch formed by the transistor 185 and prevents electricity from reaching the second plurality of LEDs 182.

When the phototransistor 186 detects light, no electric current flows into the first base 223 of the transistor 185 and the transistor 185 acts as an open switch that disconnects the rechargeable battery 188 from the second plurality of LEDs 182.

When the phototransistor 186 detects darkness, the phototransistor 186 acts as an open switch and routs the electric current flowing through the pull-up resistor 187 into the first base 223 of the transistor 185. This causes the switch formed by the transistor 185 to close thereby allowing electric current from the rechargeable battery 188 to flow through, and illuminate, the second plurality of LEDs 182.

The pull-up resistor 187 is an electrical resistor that limits the flow of electricity through the phototransistor 186 and the first base 223 of the transistor 185.

The rechargeable battery 188 is a commercially available rechargeable battery 188. The chemical energy stored within the rechargeable battery 188 is renewed and restored through the use of the charging base 102. The charging base 102 is an electrical circuit that reverses the polarity of the rechargeable battery 188 and provides the energy necessary to reverse the chemical processes that the rechargeable battery 188 initially used to generate the electrical energy. This reversal of the chemical process creates a chemical potential energy that will later be used by the rechargeable battery 188 to generate electricity. The charging base 102 comprises a DC power source 162. The charging base 102 provides electrical energy through the DC power source 162. The second diode 163 is an electrical device that allows electric current to flow in only one direction. The second diode 163 installs between the rechargeable battery 188 and the DC power source 162 such that electricity will not flow from the first positive terminal 241 of the rechargeable battery 188 into the second positive terminal 242 of the DC power source 162.

The first diode 189 is an electrical device that limits the flow of electricity to one direction. The first diode 189 is wired to prevent the flow of electricity from the plug 190 to the first negative terminal 251 of the rechargeable battery 188.

The plug 190 is the segment that attaches the light bulb 103 to the first socket 151 of the lamp base 101. The plug 190 is the plug segment that attaches the light bulb 103 to the second socket 161 of the charging base 102.

The following eight paragraphs describe the assembly of the invention 100.

Figure 10:
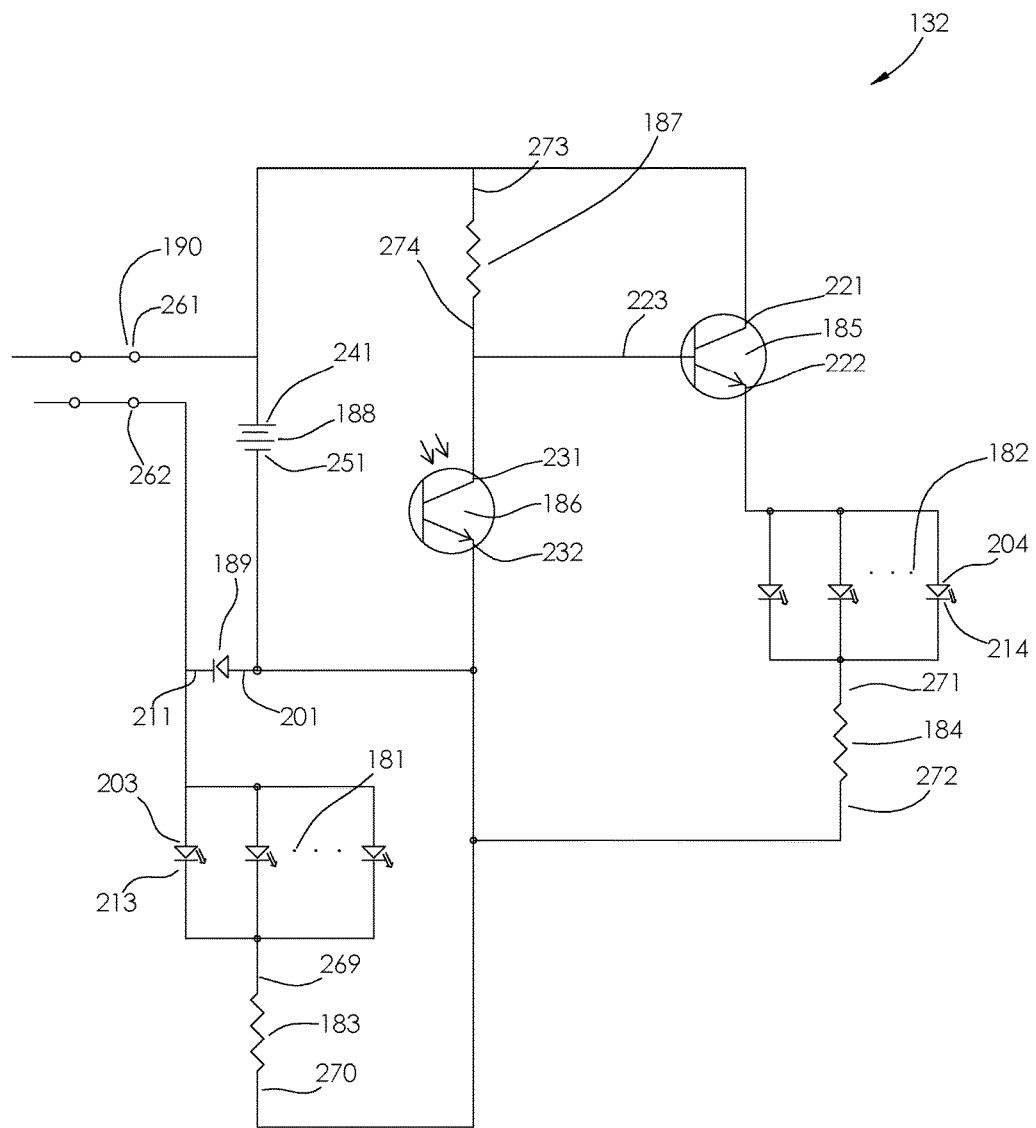
FIG. 10 is a schematic view of an embodiment of the disclosure.

As shown most clearly in FIG. 10, the first lead 261 of the plug 190 electrically connects to the first positive terminal 241 of the rechargeable battery 188.

The first positive terminal 241 of the rechargeable battery 188 electrically connects to the thirteenth lead 273 of the pull-up resistor 187. The first positive terminal 241 of the rechargeable battery 188 electrically connects to the first collector 221 of the transistor 185. The fourteenth lead 274 of the pull-up resistor 187 electrically connects to the second collector 231 of the phototransistor 186. The fourteenth lead 274 of the pull-up resistor 187 electrically connects to the first base 223 of the transistor 185. The second emitter 232 of the phototransistor 186 electrically connects to the first anode 201 of the first diode 189.

The first emitter 222 of the transistor 185 electrically connects to the fourth anode 204 of each of the second plurality of LEDs 182. The fourth cathode 214 of each of the second plurality of LEDs 182 electrically connects to the eleventh lead 271 of the second limit resistor 184. The twelfth lead 272 of the second limit resistor 184 electrically connects to the first anode 201 of the first diode 189.

The second lead 262 of the plug 190 electrically connects to the first cathode 211 of the first diode 189. The second lead 262 of the plug 190 electrically connects to the third anode 203 of each of the first plurality of LEDs 181.

The third cathode 213 of each of the first plurality of LEDs 181 electrically connects to the ninth lead 269 of the first limit resistor 183. The tenth lead 270 of the first limit resistor 183 electrically connects to the first anode 201 of the first diode 189.

Figure 11:
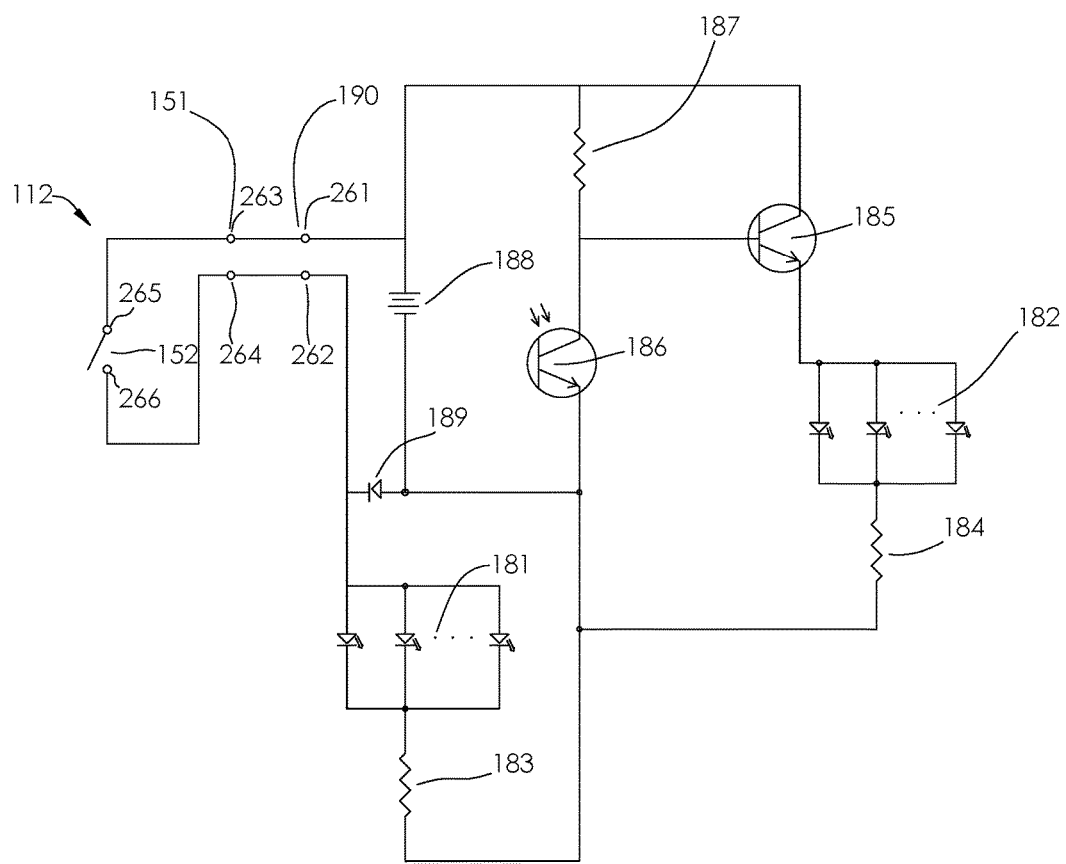
FIG. 11 is a schematic view of an embodiment of the disclosure.

As shown most clearly in FIG. 11, the fifth lead 265 of the maintained switch 152 electrically connects to the third lead 263 of the first socket 151. The sixth lead 266 of the maintained switch 152 electrically connects to the fourth lead 264 of the first socket 151. The third lead 263 of the first socket 151 electrically connects to the first lead 261 of the Plug 190 when the Plug 190 is positioned into the first socket 151. The fourth lead 264 of the first socket 151 electrically connects to the second lead 262 of the Plug 190 when the Plug 190 is inserted into the first socket 151.

Figure 12:
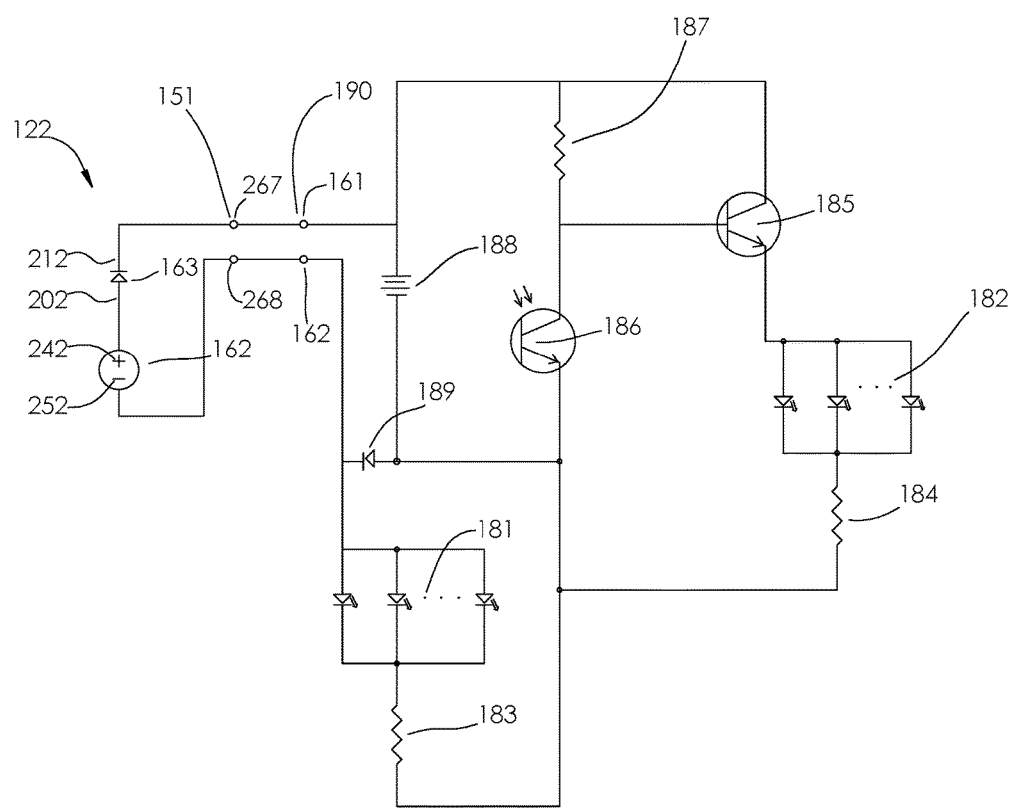
FIG. 12 is a schematic view of an embodiment of the disclosure.

As shown most clearly in FIG. 12, the second positive terminal 242 of the DC power source 162 electrically connects to the second anode 202 of the second diode 163. The second cathode 212 of the second diode 163 electrically connects to the seventh lead 267 of the second socket 161. The second negative terminal 252 of the DC power source 162 electrically connects to the eighth lead 268 of the second socket 161. The seventh lead 267 of the second socket 161 electrically connects to the first lead 261 of the Plug 190 when the Plug 190 is inserted into the second socket 161. The second negative terminal 252 of the DC power source 162 electrically connects to the eighth lead 268 of the second socket 161 when the Plug 190 is inserted into the second socket 161.

Figure 13:
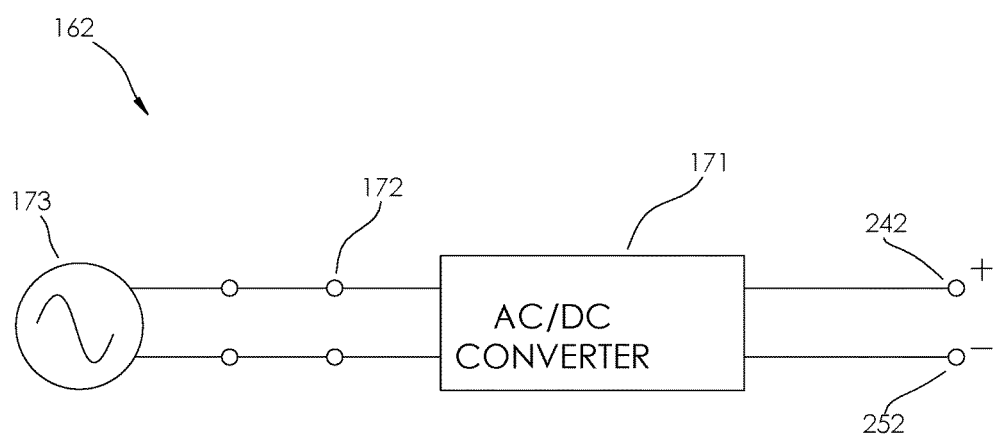
FIG. 13 is a schematic view of an embodiment of the disclosure.

As shown most clearly in FIG. 13, the NEMA 5/15P electrical plug 172 electrically connects the AC/DC converter 171 to the external power source 173. The AC/DC converter 171 forms the second positive terminal 242 and the second negative terminal 252 of the DC power source 162.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage. Method to design and build AC/DC converters are well known in the electrical arts.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter, the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power. A battery is further defined with a positive terminal and a negative terminal.

DC: As used in this disclosure, DC is an acronym for direct current.

Decorative: As used in this disclosure, decorative is an adjective that refers to a first object or item that is used with a second object or item of the purpose of making the second object or item more attractive. Decorative will generally, but not necessarily, implies making the second object or item more attractive visually.

Diode: As used in this disclosure, a diode is a two terminal semiconductor device that allows current flow in only one direction. The two terminals are called the anode and the cathode. Electric current is allowed to pass from the anode to the cathode.

Extension Structure: As used in this disclosure, an extension structure is an inert physical structure that is used to extend the span of the distance between any two objects.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Housing: As used in this disclosure, a housing is a rigid casing that encloses and protects one or more devices.

Lamp: As used in this disclosure, a lamp is an electrical device that generates visible light to illuminate objects so they can be seen.

Lantern: As used in this disclosure, a lantern is a lamp with a self-contained power source that allows the lantern to illuminate a space without drawing energy from an external power source.

Light Bulb: As used in this disclosure, a light bulb is a two-terminal electrical device that generates visible light to illuminate objects so they can be seen.

Lead: As used in this disclosure, a lead is a conductor that is physically used to electrically connect an electrical component into a larger circuit assembly.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Maintained Switch: A used in this disclosure, a maintained switch is a switch that maintains the position that was set in the most recent switch actuation. A maintained switch works in an opposite manner to a momentary switch.

National Electric Grid: As used in this disclosure, the national electric grid is a synchronized and highly interconnected electrical network that distributes energy in the form of electric power from a plurality of generating stations to consumers of electricity.

NEMA 5-15P Electrical Plug: As used in this disclosure, the NEMA 5-15P Electrical Plug is a plug that is designed to be inserted into a NEMA 5-15 Electrical Socket for the purpose of delivering electrical power to electrical devices.

The NEMA 5-15P Electrical Plug is a three blade plug that is commonly found in residential and office environments within the United States.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photoswitch: As used in this disclosure, a photoswitch is a switch that is actuated by light. The operation of a photoswitch is often based on the use of a photoelectric device.

Phototransistor: As used in this disclosure, a phototransistor is a two terminal photoelectric device that performs in the manner of a transistor within an electrical circuit. Specifically, when exposed to light, a phototransistor will behave as a transistor with a voltage applied to the base that creates a base current flow into the transistor.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Pull-Up Resistor: As used in this disclosure, a pull-up resistor is an electrical resistor that is used to: 1) limit the current flow through a switching device; and, 2) to control the voltage level presented across a load resistor or a pull-down resistor.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Socket: As used in this disclosure, a socket is an electrical device that 1) forms an opening or a cavity that acts as a receptacle for an inserted object; and, 2) is designed to receive or transfer electricity to or from the object inserted in the socket.

Stanchion: As used in this disclosure, a stanchion refers to a vertical pole, post, or support.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Terminal: As used in this disclosure, a terminal is the end point of a conductor. A terminal can be the conducting wire itself or may have attached to is a device designed to facilitate an electrical connection.

Transistor: As used in this disclosure, a transistor is a general term for a three-terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal.

Translucent: As used in this disclosure, translucent refers to a material that allows light to pass through the material but that significantly scatters the light such that an object cannot be clearly seen through the material.

With respect to the above description, it is to be realized that the optimum dimensional relationship for the various components of the invention described above and in FIGS. 1 through 13 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A lighting device comprising:
   wherein the lighting device comprises a lamp base, a charging base, and a light bulb;
   wherein the lamp base electrically connects to the light bulb;
   wherein the charging base electrically connects to the light bulb;
   wherein the lamp base turns the light bulb on and off;
   wherein the light bulb is an electrical circuit that generates a first level of illumination;
   wherein the light bulb has an internal power source;
   wherein the charging base is an electrical circuit that recharges the internal power source of the light bulb;
   wherein the light bulb generates a second level of illumination;
   wherein the lamp base comprises a lamp structure and a lamp operation circuit;
   wherein the lamp structure is a housing that contains the lamp operation circuit;
   wherein the lamp structure includes a stanchion and a shade;
   wherein the stanchion is a vertically oriented post structure that forms the extension structure of the lamp base;
   wherein the stanchion raises the light bulb above a supporting surface;
   wherein the shade redirects the light generated by the light bulb;
   wherein the shade adjusts the intensity of the light generated by the light bulb;
   wherein the lamp operation circuit is a switching circuit;
   wherein the lamp operation circuit electrically connects to the light bulb;
   wherein the lamp operation circuit initiates and extinguishes the first level of illumination generated by the light bulb;
   wherein the lamp operation circuit comprises a first socket and a maintained switch;

wherein the first socket is further defined with a third lead and a fourth lead;
wherein the maintained switch is further defined with a fifth lead and a sixth lead;
wherein the maintained switch is an electrical switch;
wherein the charging base draws electrical power from an external power source;
wherein the charging base comprises a charger housing and a charging circuit;
wherein the charger housing contains the charging circuit;
wherein the charging circuit generates a DC voltage used to recharge the internal power source of the light bulb;
wherein the charging circuit comprises a second socket, a DC power source, and a second diode;
wherein the second socket, the DC power source, and the second diode are electrically interconnected;
wherein the second diode is further defined with a second anode and a second cathode;
wherein the second socket is further defined with a seventh lead and an eighth lead;
wherein the DC power source is further defined with a second positive terminal and a second negative terminal;
wherein the DC power source draws, rectifies, conditions, and regulates electrical power from an external power source;
wherein the DC power source comprises an AC/DC converter, a NEMA 5/15P electrical plug, and an external power source;
wherein the AC/DC converter is an electrical circuit that converts an AC source of electrical energy into a regulated DC voltage source;
wherein the AC/DC converter provides the electric DC power that recharges the internal power source of the light bulb;
wherein the external power source is a source of electrical energy;
wherein the NEMA 5/15P electrical plug is an electrical device that electrically connects the AC/DC converter to the external power source;
wherein the light bulb is an electrical device;
wherein the first level of illumination that provides for the general illumination of a space;
wherein the second level of illumination that has an intensity that is less than the first level of illumination;
wherein the second level of illumination is activated when the light bulb detects darkness while being positioned in the charging base.

2. The lighting device according to claim 1
wherein the light bulb comprises a translucent housing and a bulb circuit;
wherein the translucent housing contains the bulb circuit;
wherein the translucent housing is a housing;
wherein the translucent housing is formed from a translucent material that allows the light generated by the light bulb to pass through the translucent housing.

3. The lighting device according to claim 2
wherein the bulb circuit is an electrical circuit;
wherein the bulb circuit provides the electrical power required to generate the first level of illumination and the second level of illumination;
wherein the bulb circuit generates the first level of illumination when the bulb circuit electrically connects to the lamp base;
wherein the bulb circuit generates the second level of illumination when the bulb circuit detects that the light bulb is in darkness while being positioned in the charging base.

4. The lighting device according to claim 3
wherein the bulb circuit comprises a first plurality of LEDs, a second plurality of LEDs, a first limit resistor, a second limit resistor, a transistor, a phototransistor, a pull-up resistor, a rechargeable battery, a first diode, and a Plug;
wherein the first plurality of LEDs, the second plurality of LEDs, the first limit resistor, the second limit resistor, the transistor, the phototransistor, the pull-up resistor, the rechargeable battery, the first diode, and the Plug are electrically interconnected;
wherein the Plug is externally accessible;
wherein the Plug projects away from the translucent housing;
wherein the first diode is further defined with a first anode and a first cathode;
wherein each of the first plurality of LEDs is further defined with a third anode and a third cathode;
wherein each of the second plurality of LEDs is further defined with a fourth anode and a fourth cathode;
wherein the transistor is further defined with a first collector, a first emitter, and a first base;
wherein the phototransistor is further defined with a second collector and a second emitter;
wherein the rechargeable battery is further defined with a first positive terminal and a first negative terminal;
wherein the first limit resistor is further defined with a ninth lead and a tenth lead;
wherein the second limit resistor is further defined with an eleventh lead and a twelfth lead;
wherein the pull-up resistor is further defined with a thirteenth lead and a fourteenth lead;
wherein the Plug is further defined with a first lead and a second lead.

5. The lighting device according to claim 4
wherein the first plurality of LEDs comprises a first set of light emitting diodes;
wherein the first plurality of LEDs generates the first level of illumination;
wherein the first plurality of LEDs are electrically interconnected in a parallel circuit;
wherein the first plurality of LEDs draws power from the rechargeable battery;
wherein the flow of electricity from the rechargeable battery to the first plurality of LEDs is controlled by the maintained switch.

6. The lighting device according to claim 5
wherein the second plurality of LEDs comprise a second set of light emitting diodes;
wherein the second plurality of LEDs generate the second level of illumination;
wherein the second plurality of LEDs are electrically interconnected in a parallel circuit;
wherein the transistor, the phototransistor, and the pull-up resistor control the operation of the second plurality of LEDs.

7. The lighting device according to claim 6
wherein the transistor is a three-terminal semiconducting device;
wherein the transistor operates as a switch;
wherein the transistor acts as a switch placed in series between the rechargeable battery and the second plurality of LEDs.

8. The lighting device according to claim 7
wherein the phototransistor operates as a photoswitch;
wherein the phototransistor is wired as a switch that bypasses the first base of the transistor;
wherein the phototransistor limits the illumination of the second plurality of LEDs to periods of darkness;
wherein when the phototransistor detects darkness, an electric current flows into the first base of the transistor such that the transistor acts as a closed switch that passes electric current from the rechargeable battery to the second plurality of LEDs.

9. The lighting device according to claim 8
wherein the first limit resistor is an electrical resistor;
wherein the first limit resistor limits the flow of electricity through the first plurality of LEDs;
wherein the second limit resistor is an electrical resistor;
wherein the second limit limits the flow of electricity through the second plurality of LEDs;
wherein the pull-up resistor is an electrical resistor;
wherein the pull-up resistor limits the flow of electricity through the phototransistor and the first base of the transistor.

10. The lighting device according to claim 9
wherein the charging base is an electrical circuit that reverses the polarity of the rechargeable battery;
wherein the charging base provides electrical energy through the DC power source;
wherein the second diode is an electrical device that allows electric current to flow in only one direction;
wherein the second diode installs between the rechargeable battery and the DC power source such that electricity will not flow from the first positive terminal of the rechargeable battery into the second positive terminal of the DC power source.

11. The lighting device according to claim 10
wherein the first diode is an electrical device that limits the flow of electricity to one direction;
wherein the first diode is wired to prevent the flow of electricity from the Plug to the first negative terminal of the rechargeable battery.

12. The lighting device according to claim 11
wherein the Plug is the plug segment that attaches the light bulb to the first socket of the lamp base;
wherein the Plug is the plug segment that attaches the light bulb to the second socket of the charging base.

13. The lighting device according to claim 11
wherein the first lead of the Plug electrically connects to the first positive terminal of the rechargeable battery;
wherein the first positive terminal of the rechargeable battery electrically connects to the thirteenth lead of the pull-up resistor;
wherein the first positive terminal of the rechargeable battery electrically connects to the first collector of the transistor;
wherein the fourteenth lead of the pull-up resistor electrically connects to the second collector of the phototransistor;
wherein the fourteenth lead of the pull-up resistor electrically connects to the first base of the transistor;
wherein the second emitter of the phototransistor electrically connects to the first anode of the first diode;
wherein the first emitter of the transistor electrically connects to the fourth anode of each of the second plurality of LEDs;
wherein the fourth cathode of each of the second plurality of LEDs electrically connects to the eleventh lead of the second limit resistor;
wherein the twelfth lead of the second limit resistor electrically connects to the first anode of the first diode;
wherein the second lead of the Plug electrically connects to the first cathode of the first diode;
wherein the second lead of the Plug electrically connects to the third anode of each of the first plurality of LEDs;
wherein the third cathode of each of the first plurality of LEDs electrically connects to the ninth lead of the first limit resistor;
wherein the tenth lead of the first limit resistor electrically connects to the first anode of the first diode;
wherein the fifth lead of the maintained switch electrically connects to the third lead of the first socket;
wherein the sixth lead of the maintained switch electrically connects to the fourth lead of the first socket;
wherein the third lead of the first socket electrically connects to the first lead of the Plug when the Plug screws into the first socket;
wherein the fourth lead of the first socket electrically connects to the second lead of the Plug when the Plug screws into the first socket;
wherein the second positive terminal of the DC power source electrically connects to the second anode of the second diode;
wherein the second cathode of the second diode electrically connects to the seventh lead of the second socket;
wherein the second negative terminal of the DC power source electrically connects to the eighth lead of the second socket;
wherein the seventh lead of the second socket electrically connects to the first lead of the Plug when the Plug screws into the second socket;
wherein the second negative terminal of the DC power source electrically connects to the eighth lead of the second socket when the Plug screws into the second socket;
wherein the NEMA 5/15p electrical plug electrically connects the AC/DC converter to the external power source;
wherein the AC/DC converter forms the second positive terminal and the second negative terminal of the DC power source.

* * * * *